(12) United States Patent
Munts

(10) Patent No.: US 11,814,813 B2
(45) Date of Patent: Nov. 14, 2023

(54) CUTTER HEAD WITH SKIRT

(71) Applicant: IHC Holland IE B.V., Sliedrecht (NL)

(72) Inventor: Edwin Albert Munts, Delft (NL)

(73) Assignee: IHC Holland IE B.V., Sliedrecht (NL)

(*) Notice: Subject to any disclaimer, the term of this patent is extended or adjusted under 35 U.S.C. 154(b) by 672 days.

(21) Appl. No.: 16/613,450

(22) PCT Filed: May 9, 2018

(86) PCT No.: PCT/NL2018/050303
§ 371 (c)(1),
(2) Date: Nov. 14, 2019

(87) PCT Pub. No.: WO2018/212644
PCT Pub. Date: Nov. 22, 2018

(65) Prior Publication Data
US 2021/0087783 A1  Mar. 25, 2021

(30) Foreign Application Priority Data

May 15, 2017  (NL) ........................... 2018916

(51) Int. Cl.
*E21B 10/43* (2006.01)
*E02F 3/92* (2006.01)
(Continued)

(52) U.S. Cl.
CPC .......... *E02F 3/9275* (2013.01); *B23K 31/025* (2013.01); *E02F 3/8841* (2013.01); *E02F 3/9293* (2013.01)

(58) Field of Classification Search
CPC ......... E02F 3/9231; E02F 3/905; E02F 3/907; E02F 3/9237; E02F 3/9243; E02F 3/9293;
(Continued)

(56) References Cited

U.S. PATENT DOCUMENTS 331,861 A * 12/1885 Bolles ................... E02F 3/9231
37/327
365,140 A *  6/1887 Lynch ................... E02F 3/9231
37/327
(Continued)

FOREIGN PATENT DOCUMENTS

CN     202324036 U    7/2012
EP      1989359 A1   11/2008
(Continued)

*Primary Examiner* — Edwin J Toledo-Duran
(74) *Attorney, Agent, or Firm* — N.V. Nederlandsch Octrooibureau

(57) ABSTRACT

A cutter head arranged to rotate about an axis of rotation for removing material from a water bed comprises a base ring positioned respect to the axis of rotation; a hub positioned with respect to the axis of rotation; a plurality of arms extending between the base ring and the hub, the arms comprising a plurality of cutting tools; and a plurality of skirts, each skirt extending from one of the plurality of arms to the hub to form a closed surface between the arm and the hub from a distal end of the cutter head toward the base ring and ending with a side configured to be parallel to a backplate, leaving an open channel between the skirt and the backplate.

18 Claims, 3 Drawing Sheets

Figure 1:
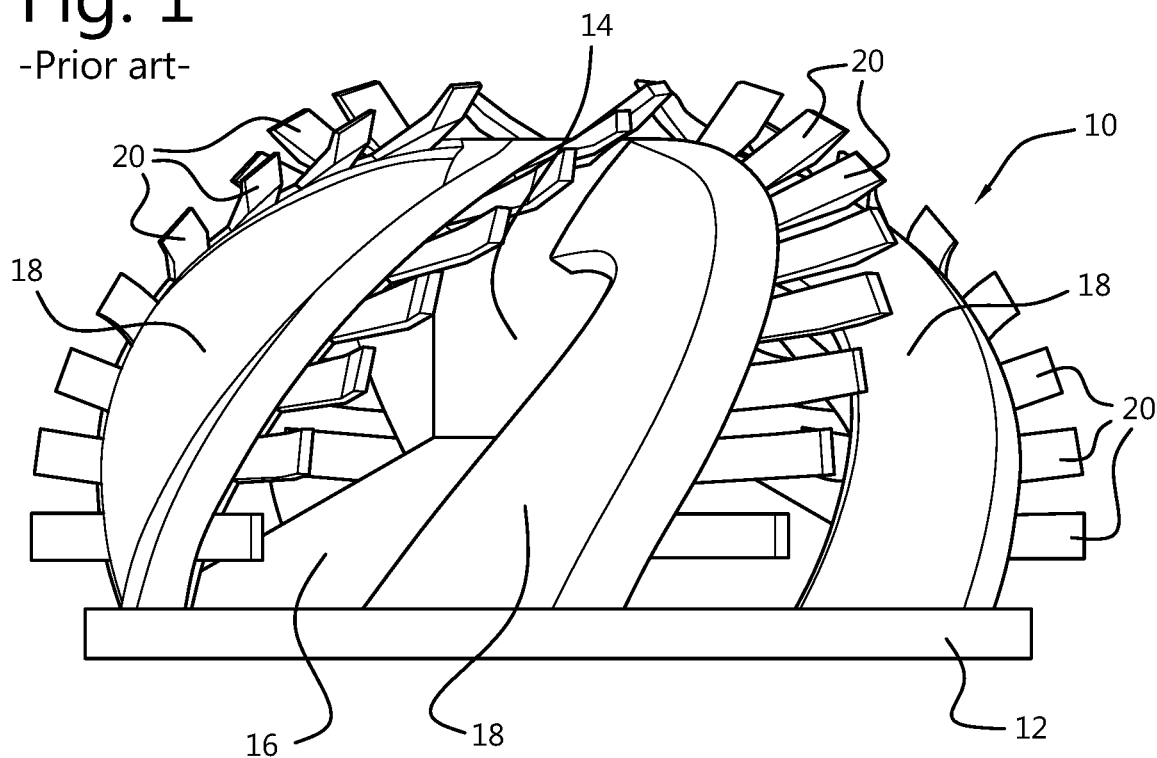

(51) Int. Cl.
*B23K 31/02* (2006.01)
*E02F 3/88* (2006.01)

(58) Field of Classification Search
CPC ..... E02F 3/9225; E02F 3/9275; E02F 3/8841; E02F 3/9212; E02F 9/2866; E02F 5/282; B23K 31/025; E21B 10/43
See application file for complete search history.

(56) References Cited

U.S. PATENT DOCUMENTS

| | | | | |
|---|---|---|---|---|
| 386,866 A * | 7/1888 | Brainard | E02F 3/9231 | 37/330 |
| 504,750 A * | 9/1893 | Robinson | E02F 3/9212 | 37/450 |
| 506,354 A * | 10/1893 | Yerrington | E02F 3/9231 | 37/327 |
| 521,580 A * | 6/1894 | Bates | E02F 3/9231 | 37/334 |
| 526,514 A * | 9/1894 | Bates | E02F 3/9231 | 37/327 |
| 637,831 A * | 11/1899 | Robinson | E02F 3/9231 | 37/327 |
| 682,024 A * | 9/1901 | Bradley | E02F 3/9231 | 37/327 |
| 709,861 A * | 9/1902 | Bates | E02F 3/9231 | 37/327 |
| 727,691 A * | 5/1903 | Robinson | E02F 3/9231 | 37/327 |
| 744,703 A * | 11/1903 | Harris | E02F 3/9231 | 37/327 |
| 768,106 A * | 8/1904 | Williams | E02F 3/9231 | 37/327 |
| 777,180 A * | 12/1904 | Cantwell | E02F 3/9231 | 37/327 |
| 797,109 A * | 8/1905 | Harris | E02F 3/9225 | 37/328 |
| 805,965 A * | 11/1905 | Jones | E02F 3/9231 | 37/325 |
| 819,723 A * | 5/1906 | Cantwell | E02F 3/9231 | 37/327 |
| 833,797 A * | 10/1906 | Ollrich | E02F 3/9225 | 37/448 |
| 856,487 A * | 6/1907 | Ollrich | E02F 3/9225 | 37/328 |
| 856,544 A * | 6/1907 | Ollrich | E02F 3/9225 | 37/328 |
| 962,120 A * | 6/1910 | Bradley | E02F 3/9231 | 299/9 |
| 977,901 A * | 12/1910 | Robinson | E02F 3/9231 | 37/325 |
| 1,087,269 A * | 2/1914 | Baltz | E02F 3/9231 | 37/327 |
| 1,159,937 A * | 11/1915 | Hart et al. | E02F 3/9231 | 37/327 |
| 1,226,386 A * | 5/1917 | Sackett | E02F 3/9293 | 37/328 |
| 1,316,349 A * | 9/1919 | Calder | E02F 3/9225 | 37/328 |
| 1,759,490 A * | 5/1930 | Neveling | E02F 3/9231 | 37/322 |
| 1,821,177 A * | 9/1931 | William | E02F 3/9293 | 37/327 |
| 1,840,025 A * | 1/1932 | Daniels | E02F 3/9293 | 37/327 |
| 2,002,749 A * | 5/1935 | Neveling, Sr. | E02F 3/9231 | 37/331 |
| 2,017,816 A * | 10/1935 | MacFadyen | E02F 3/9231 | 37/327 |
| 2,029,816 A * | 2/1936 | Williard | E02F 3/9293 | 37/327 |
| 2,090,790 A * | 8/1937 | Fray | E02F 3/9225 | 37/327 |
| 2,103,124 A * | 12/1937 | Stires | E02F 3/9293 | 37/328 |
| 2,340,216 A * | 1/1944 | Gill | E02F 3/9231 | 175/413 |
| 2,352,394 A * | 6/1944 | Little | E02F 3/9231 | 37/327 |
| 2,370,430 A * | 2/1945 | Waldeck | E02F 3/9231 | 37/446 |
| 2,530,951 A * | 11/1950 | Enright | E02F 3/9231 | 37/327 |
| 2,702,437 A * | 2/1955 | Cushing | A01B 13/12 | 37/327 |
| 2,705,379 A * | 4/1955 | Fruhling | E02F 3/06 | 37/189 |
| 2,991,568 A * | 7/1961 | Smith | E02F 5/006 | 37/325 |
| 2,999,324 A * | 9/1961 | Ohlhausen | E02F 3/9293 | 37/327 |
| 3,136,583 A * | 6/1964 | Griffin, III | E02F 3/9231 | 406/135 |
| 3,235,018 A * | 2/1966 | Troeppl | E02F 9/2866 | 175/391 |
| 3,673,716 A * | 7/1972 | Trondle | E02F 3/925 | 37/322 |
| 3,760,518 A * | 9/1973 | Hamm | E02F 3/9231 | 37/189 |
| 3,807,066 A * | 4/1974 | Proehl | E02F 3/9225 | 37/327 |
| 3,808,716 A * | 5/1974 | Verbeek | E02F 9/2866 | 37/448 |
| 3,871,488 A * | 3/1975 | Sabre | E21B 10/58 | 175/391 |
| 4,050,170 A * | 9/1977 | Proehl | E02F 3/9225 | 37/328 |
| 4,080,708 A * | 3/1978 | Decombe | E02F 9/2866 | 29/418 |
| 4,305,214 A * | 12/1981 | Hurst | F04D 7/04 | 415/196 |
| 4,319,415 A * | 3/1982 | Mayerbock | E02F 3/9225 | 37/328 |
| 4,327,507 A * | 5/1982 | Volbeda | E02F 3/9231 | 299/81.1 |
| 4,365,427 A * | 12/1982 | Chapman, Jr. | E02F 3/94 | 37/327 |
| 4,373,277 A * | 2/1983 | Cucheran | E02F 3/9231 | 37/327 |
| 4,403,428 A * | 9/1983 | Chapman, Jr. | E02F 3/94 | 37/319 |
| 4,470,210 A * | 9/1984 | Hahn | E02F 9/2816 | 299/108 |
| 4,986,011 A * | 1/1991 | van Hemmen | E02F 9/2866 | 299/109 |
| 5,617,654 A * | 4/1997 | Wetta, II | E02F 3/9212 | 37/327 |
| 6,250,404 B1 * | 6/2001 | Gunsaulis | E21B 7/064 | 175/62 |
| 7,739,812 B2 * | 6/2010 | Wijma | E02F 3/9212 | 37/324 |
| 9,453,324 B2 * | 9/2016 | Van Opstal | E02F 5/282 | |
| 2006/0151631 A1 * | 7/2006 | Redding | E02F 9/06 | 239/383 |
| 2008/0172911 A1 * | 7/2008 | Buhr | E02F 3/9212 | 37/317 |
| 2009/0133295 A1 * | 5/2009 | Wijma | E02F 3/9212 | 37/327 |
| 2012/0000712 A1 * | 1/2012 | Claessens | E02F 3/9231 | 37/326 |
| 2015/0027788 A1 * | 1/2015 | Maw | E21B 10/43 | 51/297 |
| 2015/0275473 A1 * | 10/2015 | Van Opstal | E02F 3/9231 | 37/343 |
| 2015/0377254 A1 * | 12/2015 | Pol | F04D 13/08 | 415/121.2 |

(56) References Cited

U.S. PATENT DOCUMENTS

2016/0376765 A1* 12/2016 Breken ................ E02F 3/9275
                                                       37/343
2020/0173142 A1*  6/2020 Yousef .................... E02F 3/905
2021/0087887 A1*  3/2021 Ainge ..................... E21B 10/26

FOREIGN PATENT DOCUMENTS

| JP | 49 87602 U | 7/1974 |
|----|------------|--------|
| JP | 52 142702 U | 10/1977 |
| JP | 57 174568 U | 11/1982 |
| NL | 7902378 A | 9/1980 |
| NL | 8104969 A | 6/1983 |
| SU | 612031 A1 | 6/1978 |
| WO | 2007/100250 A1 | 9/2007 |

\* cited by examiner

CUTTER HEAD WITH SKIRT

BACKGROUND

Cutter-suction dredgers ("CSD") are vessels which can be used to cut and loosen material which is at least partly underwater. This cut material can then be sucked into a suction tube. CSD's are often used to cut hard surface materials, such as rock, although they may also be used to excavate gravel or sand.

CSD's typically use a suction tube with a cutter head at the suction inlet. The cutter head may be connected to the dredger with a hub that is mounted on an axis with a drive to rotate the cutter head. The axis of rotation is referred to as the axial direction of the cutter head. The cutter head and suction inlet may be moveable with respect to the water bed being dredged. In order to draw the material into the suction tube, a wear-resistant pump may be provided, for example, a centrifugal pump. The material cut by the cutter head that has been drawn into the suction tube may then be transported away from the CSD, for example, by a floating pipe line to a dumping location.

A prior art cutter head is shown in FIG. 1. Cutter head 10 includes a base ring 12 and a hub 14, with backplate 16 which includes a suction opening (not shown). The hub 14 and base ring 12 are connected by a plurality of arms 18 extending in an axial direction. The arms 18 may be curved in a tangential and radial direction such that the arms spiral toward each other. In other cutter heads, the arms may be curved in the radial direction only, while being axially aligned or at a small angle with respect to the axial direction. Each arm 18 must be connected to the base ring 12 and to the hub 14, typically by welding. The cutter head 10 may additionally be provided with different excavating tools 20, for example, teeth in the shape of chisels or another shape to assist in the excavation. These cutting tools 20 can be attached to the arms 18. The back plate is secured to a non-moving part such as a ladder, and does not rotate with the cutter head 10, but instead forms a surface to expose the suction mouth to the material cut by the cutter head 10 as the cutter head 10 rotates.

During the excavation process of a cutter suction dredger, not all material cut by the cutter head will be sucked up directly by the suction mouth. This process is referred to as spill. The consequence of spill is that it lowers the production rate since the density of the mixture set by the cutter head suction mouth will lower due to sucking in additional water and less cut material. Spill also increases the time required for a given excavation depth as the spilled material needs to be removed by additional sweeps.

SUMMARY OF THE INVENTION

According to a first aspect of the invention, a cutter head arranged to rotate about an axis of rotation for removing material from a water bed comprises a base ring positioned with respect to the axis of rotation; a hub positioned with respect to the axis of rotation; a plurality of arms extending between the base ring and the hub, the arms comprising a plurality of cutting tools; and a plurality of skirts, each skirt extending from one of the plurality of arms to the hub to form a closed surface between the arm and the hub from a distal end of the cutter head toward the base ring and ending with a side configured to be parallel to a backplate, leaving an open channel between the skirt and the backplate.

Such a cutter head with a plurality of skirts can result in more efficient dredging operations with less spill. The skirts form closed channels from the distal end of the cutter head toward where the cut material will be suctioned, helping to retain more of the cut material and send it toward the suction opening. Additionally, this helps to prevent the inflow of additional water with the cut material, resulting in increased production rates.

According to an embodiment, each skirt is shaped with a pitch angle. Optionally, each skirt is propeller shaped. Such configurations for the skirts can help to move the cut material toward the backplate where it will be suctioned, thereby helping to minimize spill in the dredging process.

According to an embodiment, a skirt extends between each of the plurality of arms and the hub to form a closed surface between each arm and the hub. By having a skirt extending between each arm and the hub, closed channels are formed between each arm and hub. This configuration can further increase the resistance to spillage.

According to an embodiment, the skirt extends over 20-100% of each arm length from the distal end toward the base ring. The extent of the skirt can help to resist spillage over a large amount of the cutter head.

According to an embodiment, the arms extend rotatingly from the base ring to the hub. This configuration can help with the cutting ability of the cutter head.

According to an embodiment, the plurality of skirts comprise the same material as the plurality of arms. Optionally, the arms and the skirts could be formed integrally. By forming the arms and skirts of the same or similar materials, they will be able to equally withstand forces from cutting operations, and would generally require similar maintenance routines, making the overall cutter head more simple to maintain.

According to an embodiment, the cutter head is a part of a vessel with a ladder. Optionally, the vessel could be a cutter-suction dredger. Such a vessel with a cutter head would have more efficient dredging operations as the cutter head would result in less spillage and a more dense mixture being cleared and suctioned to the vessel.

According to an embodiment, the vessel further comprises a backplate secured to the ladder and extending between the base ring and the hub at a position to form the open channel with the skirts. The backplate comprises a suction opening. Such an arrangement forms an open channel between the skirts and the backplate which helps to funnel the cut mixture into the suction opening from the closed channels between spill skirts. Optionally, the height of the channel between the backplate and the skirt is between about 1% and 20% of the diameter of the base ring, and can depend on the size of the cutter head and the material to be cut amongst other factors.

According to an embodiment, the backplate is angled toward the distal end of the cutter head from the base ring. In such an embodiment, the end of the skirt would also likely be angled such that the height of the channel stays the same.

According to a further aspect of the invention, a method of forming a cutter head with skirts comprises obtaining a cutter head comprising a base ring, a hub, a plurality of arms extending between the base ring and the hub, and a plurality of cutting tools on the plurality of arms; and connecting a plurality of skirts to the cutter head to form closed channels between at least some of the plurality of arms and the hub from a distal end of the cutter head toward the base ring ending with a surface configured to be parallel to a backplate and leave an open channel between the backplate and each skirt. Such a method can form a cutter head that minimizes spillage and increases the efficiency of a dredging operation.

According to an embodiment, the step of connecting the plurality of skirts comprises welding the plurality of skirts to the plurality of arms and to the hub. Welding can provide an effective means of connecting the skirts after they have been manufactured separately. Manufacturing skirts separately can be a simpler method of manufacture, particularly when the skirt will have a complex shape and/or bend.

According to an embodiment, the plurality of skirts are integrally formed with the plurality of arms, and the step of connecting a plurality of skirts comprises connecting a plurality of skirts to the hub to form closed channels between at least some of the plurality of arms and the hub from a distal end of the cutter head toward the base ring ending with a surface configured to be parallel to a backplate and leaving an open channel between the backplate and each skirt. Forming the plurality of arms integrally with the plurality of skirts ensures a strong connection between the arms and skirts for cutting operations.

According to an embodiment, the method further comprises connecting a plurality of cutting tools to the plurality of arms. Connecting cutting tools to the plurality of arms can ensure that the cutter head is able to effectively cut a bed, particularly when that bed is hard.

According to an embodiment, the step of connecting a plurality of skirts to the cutter head comprises connecting a skirt to form closed channels between each of the plurality of arms and the hub. Connecting a skirt to each arm to form a closed channel between each of the arms can ensure a very high resistance to spillage during a dredging operation with the cutter head.

According to a further aspect of the invention, a skirt for a cutter head comprises a rigid body configured to connect between an arm and a hub of a cutter head and extend from the distal end toward a backplate. Such a skirt can be connected to an existing cutter head to increase the resistance of spillage of such a cutter head.

According to an embodiment, the skirt is shaped to encourage flow from the distal end toward the backplate. The shape can be, for example, with a pitch angle, curve, propeller shape, and/or tapering thickness.

SHORT DESCRIPTION OF DRAWINGS

Figure 2A:
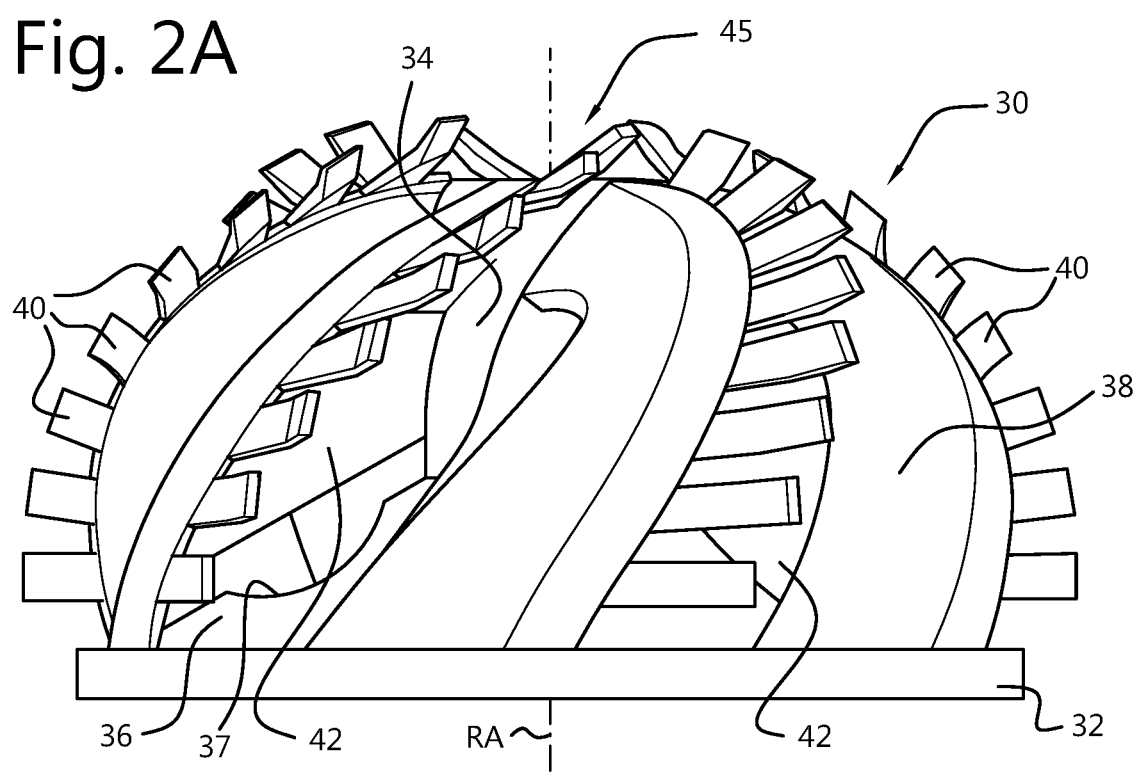
Figure 2B:
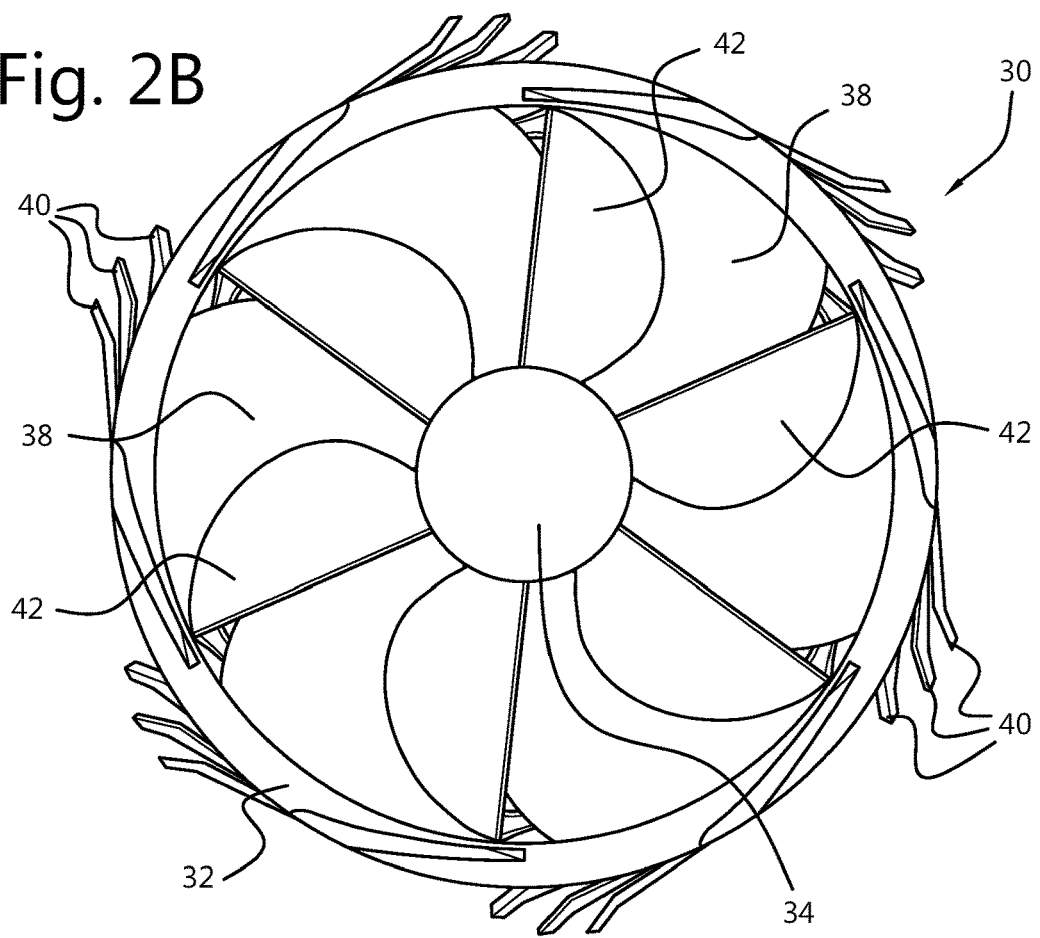
Figure 2C:
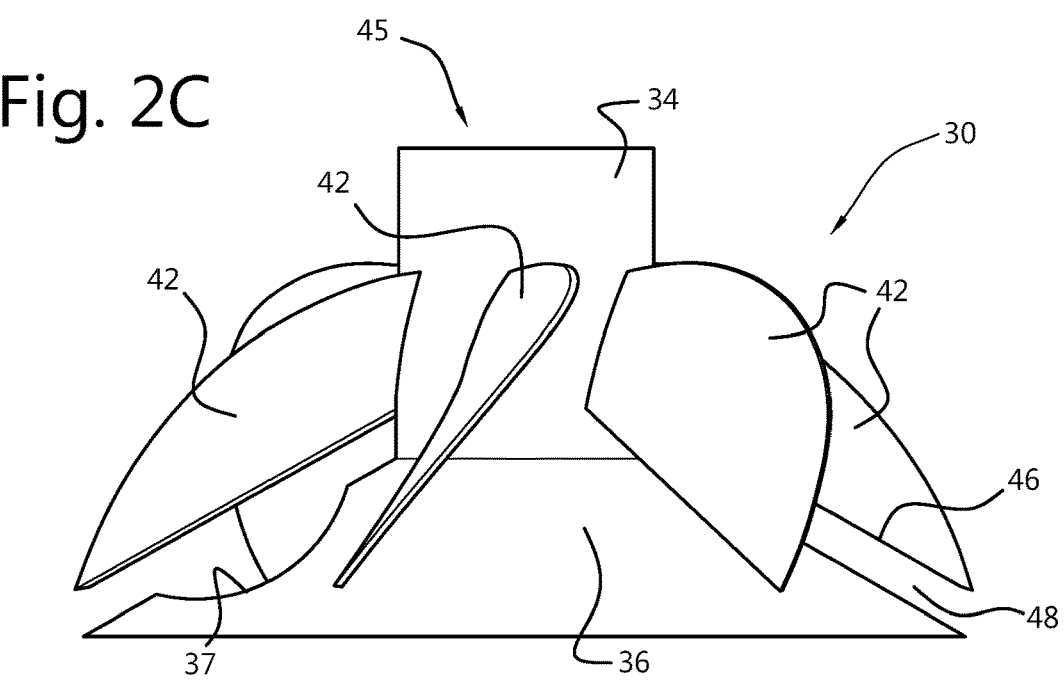
Figure 3:
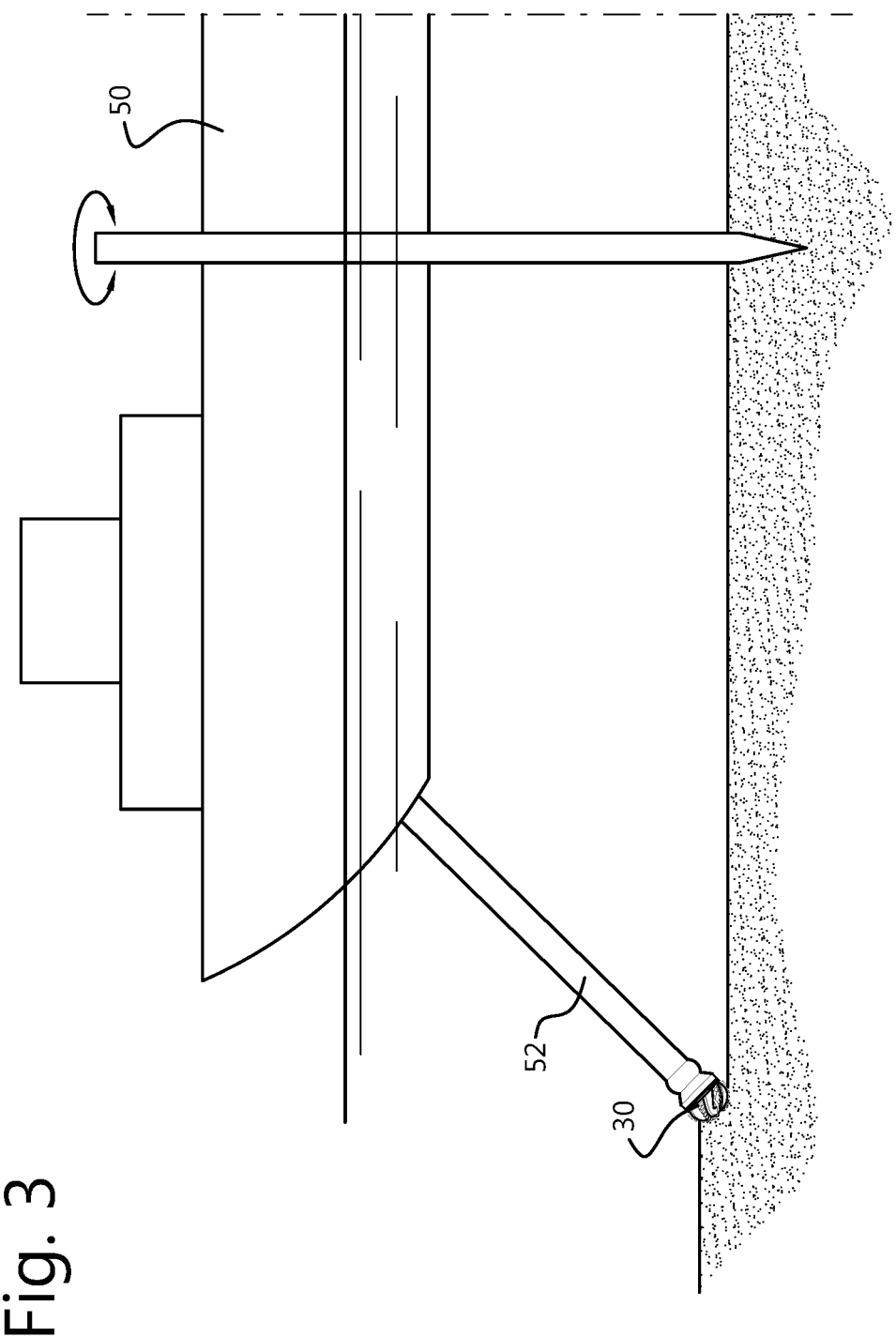

The present invention will be discussed in more detail below, with reference to the attached drawings, in which
FIG. 1 shows a side view of a prior art cutter head.
FIG. 2A shows a side view of a cutter head with spill skirt.
FIG. 2B shows a back view of the cutter head with skirt of FIG. 2A, with a backplate removed.
FIG. 2C shows a side view of the cutter head of FIG. 2A, with arms and a base ring removed.
FIG. 3 shows a view of a dredger with a cutter head.

DESCRIPTION OF EMBODIMENTS

FIG. 2A shows a side view of a cutter head 30, with base ring 32, hub 34, backplate 36 with suction opening 37, arms 38, cutting tools 40 and spill skirts 42. FIG. 2B shows a back view of cutter head 30, with backplate 36 removed, and FIG. 2C shows a side view of cutter head 30, with arms 38 and base ring 32 removed.

Arms 38 extend between base ring 32 and hub 34. Cutting tools 40 extend from arms 38 and can be formed integral or can be attached. Cutting tools 40 can take many different forms. Backplate 36 connects to a stationary part, for example, a ladder (see FIG. 3).

Spill skirts 42 each connect to hub 34 and to one arm 38, extending from distal end 45 toward base ring 32 to form a closed surface between arms 38 and hub 34. This forms closed channels between adjacent arms 38 with spill skirts 42. Spill skirts 42 end with a side 46 parallel to back plate 36, and leaving an opening 48 between skirt 42 and backplate 36. These openings 48 form a channel between skirts 42 and backplate 36. The opening can be based on the diameter of the base ring 32, and can be about 1%-20% of the diameter of the base ring 32.

Spill skirts 42 can be formed integral with arms 38 or can be formed separate, and connected to arms 38 and hub 34, for example, by welding. Each spill skirt 42 is shaped with a propeller shaped pitch angle to influence flow, though in other embodiments skirts 42 may be shaped differently. Skirts 42 can be made of the same material as arms 38 or a different durable material (e.g., iron), and can extend over 20%-100% of each arm length.

Cutter head 30 can be connected to a vessel, for example dredger 50, shown in FIG. 3 for excavation. Cutter head 30 is connected to ladder 52, and is used to cut hard surface materials, such as rock. Hub 34 is connected to and driven by a drive shaft (not shown) to rotate cutter head 30 around its axis of rotation RA. The cut material is then guided along closed channels between spill skirts 42 toward backplate 36, where it will enter suction opening 37 and be transported away from cutter head 30.

As mentioned in the background, the open space of the interior of prior art cutter heads lead to cut material more easily escaping from the cutter head before entering the suction opening. By closing the space between arms 38 with spill skirts 42, cutter head 30 helps to minimize this spillage when performing a cutting operation. The cut material is guided toward the open channel between spill skirts 42 and backplate 36 by spill skirts 42, thereby ensuring more of the cut material is suctioned through suction opening 37 when the suction opening passes by. This reduces water ingestion from the surroundings, and therefore ensures that the dredging mixture is higher in density and that entire dredging process is more efficient by requiring fewer sweeps to remove the desired amount of material.

The shape of spill skirts 42, for example, spill skirts 42 with a pitch angle resembling a propeller shape can help further reduce spill. The shape can assist in accelerating cut material away from distal end 45 towards the area which will pass by suction opening 37.

By using spill skirts 42 to minimize the cut material that spills out of cutter head during a cutting process, cutter head 30 helps to increase the density of the suctioned mixture and ensure that the overall dredging process is more efficient.

Cutter head 30 can be formed from prior art cutter heads by adding spill skirts 42 as described in relation to FIGS. 2A-2C. They can be incorporated, for example, by welding spill skirts 42 to a prior art cutter head. This can make for an economical way of improving dredging efficiency by reusing older cutter heads, and making them more efficient for a dredging process.

In summary, the addition of a plurality of spill skirts 42 help to retain cut material for suctioning through a suction opening 37. Spill skirts 42 assist in retaining material in the closed channels between spill skirts 42 and hub 34, thereby reducing spill. The open channel formed between spill skirts 42 lower side 46 and backplate 36 retain material for suctioning through suction opening 37 as cutter head 30 rotates, increasing production rates by minimizing spill of cutter head 30.

While spill skirts 42 are shown as connected between every arm 38 and hub 34 in cutter head 30, in other embodiments, cutter head 30 could have fewer spill skirts 42, for example only forming channels between every other arm 38 as long as it was symmetrical around the axis of rotation. Using spill skirts with fewer than each arm 38 can help to decrease the weight of overall cutter head 30, making movement and production easier and less expensive.

Spill skirts 42 can vary in thickness, from the thickness of the arms 38 to much less depending on the needs for cutter head 30.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the appended claims.

The invention claimed is:

1. A cutter head comprising:
a base ring positioned around an axis of rotation; and
a hub positioned to rotate the cutter head about the axis of rotation;
a plurality of arms extending between and connecting to the base ring and the hub, the arms comprising a plurality of cutting tools; and
a plurality of skirts, each skirt connecting to one of the plurality of arms and to the hub to form a closed surface between the arm and the hub from a distal end of the cutter head toward the base ring and ending with a side configured to be parallel to a backplate that is angled toward the distal end of the cutter head from the base ring and extends from the base ring to the hub, wherein the skirt side parallel to the backplate is spaced from the backplate leaving an open channel between each skirt and the backplate, and wherein the cutter head is arranged to rotate about the axis of rotation for removing material from a water bed.

2. The cutter head of claim 1, wherein each skirt is shaped with a pitch angle.

3. The cutter head of claim 2, wherein each skirt is propeller shaped.

4. The cutter head of claim 1, wherein a skirt extends between each of the plurality of arms and the hub to form a closed surface between each arm and the hub.

5. The cutter head of claim 1, wherein the skirt extends over 20%-100% of each arm length from the distal end toward the base ring.

6. The cutter head of claim 1, wherein the arms extend rotatingly from the base ring to the hub.

7. The cutter head of claim 1, wherein the plurality of skirts comprise the same material as the plurality of arms.

8. A vessel comprising a ladder and the cutter head according to claim 1 connected to the ladder.

9. The vessel according to claim 8, wherein the vessel is a cutter-suction dredger.

10. The vessel according to claim 8, and further comprising a backplate secured to the ladder and extending between the base ring and the hub at a position to form the open channel with the skirts.

11. The vessel according to claim 10, wherein the backplate comprises a suction opening.

12. The vessel according to claim 10, wherein the backplate is angled toward the distal end of the cutter head from the base ring.

13. The vessel of claim 10, wherein the height of the open channel is about 1%-20% of a diameter of the base ring.

14. A method of forming a cutter head with skirts comprises:
obtaining a cutter head comprising a base ring positioned around an axis of rotation, a hub positioned to rotate the cutter head about the axis of rotation, a plurality of arms extending between and connecting to the base ring and the hub, and a plurality of cutting tools on the plurality of arms; and
connecting a plurality of skirts to the cutter head to form closed channels between at least some of the plurality of arms and the hub from a distal end of the cutter head toward the base ring and ending with a side configured to be parallel to and spaced apart from a backplate, and leave an open channel between the backplate and each skirt, the backplate being angled toward a center of the distal end of the cutter head from the base ring and extends from the base ring to the hub,
and wherein the cutter head is arranged to rotate about an axis of rotation for removing material from a water bed.

15. The method of claim 14, wherein the step of connecting the plurality of skirts comprises welding the plurality of skirts to the plurality of arms and to the hub.

16. The method of claim 14, the plurality of skirts are integrally formed with the plurality of arms, and the step of connecting a plurality of skirts comprises
connecting a plurality of skirts to the hub to form closed channels between at least some of the plurality of arms and the hub from a distal end of the cutter head toward the base ring ending with a surface configured to be parallel to a backplate and leaving an open channel between the backplate and each skirt.

17. The method of claim 14, and further comprising connecting a plurality of cutting tools to the plurality of arms.

18. The method of claim 14, wherein the step of connecting a plurality of skirts to the cutter head comprises connecting a skirt to form closed channels between each of the plurality of arms and the hub.

* * * * *